Patented Mar. 14, 1933                                              1,900,973

UNITED STATES PATENT OFFICE

HEINRICH BERTSCH, OF CHEMNITZ, GERMANY, ASSIGNOR TO H. TH. BÖHME A. G., OF CHEMNITZ, GERMANY, A CORPORATION OF GERMANY

PHOSPHORIC ACID ESTERS

No Drawing. Application filed November 11, 1927, Serial No. 232,719, and in Germany November 25, 1926.

This invention relates to improvements in oil and fat treatment. An important object of this invention is to produce novel preparations or compounds suitable for use in the textile, leather and pharmaceutical industries, or for use as penetrating or wetting agents or as solvent agents in aqueous liquids. This principal object of the invention may be said to include the production of preparations possessing characteristics similar to those of Turkey red oil.

It has long been known that it is possible to convert a large number of vegetable and animal oils and fats into a water-soluble form by treatment with sulphuric acid. Upon the treatment of any oil with concentrated sulphuric acid, hydroxyl groups or double linkages being present in the molecule, sulphuric acid esters are produced and their alkali salts, while very readily soluble in water, also exhibit properties which are very valuable in both the textile and leather industries. Also, they are very valuable in many other uses in which enhanced wetting property of a liquid, or conversion of water-insoluble subsances into aqueous dispersions, is desired.

According to this invention, esters of orthophosphoric acid are prepared which are analogous to the sulphuric acid esters and which, owing to the water-solubility in free state and in the form of their alkali salts, may also be employed advantageously in the textile and leather industries and also in many other industries. These esters, which in their physical nature simulate oils, very readily dissolve alcohols, hydrocarbons, halogen hydrocarbons, and heterocyclic bases, and these mixtures can be diluted with water to form clear solutions.

Aqueous dispersions, prepared by the solvents obtained from phosphatized oils as just mentioned, are to be utilized with notable advantage as washing agents. Also, and due to their content of phosphoric acid, the phosphatized oils may be utilized for the production of important pharmaceutical preparations, or may themselves be employed as such.

The products in accordance with this invention have the advantage over preparations produced by the action of sulphuric acid that both they, and the technical and pharmaceutical preparations produced therewith, are of much greater purity, so that they may be used in many cases where Turkey red oil, for example, cannot be employed owing to the dark colour. It would appear that the phosphoric acid, as compared with sulphuric acid, is less liable to produce dark grease by carbonization of the fatty substances.

In carrying out the invention in an economical, practical and commercial manner, the oil or fat is treated with phosphoric acid anhydride, the reaction product is washed to remove excess phosphoric acid, the said product is then separated from the acid washing water and, preferably, is finally converted into an alkali salt. The reaction may be accelerated and assisted by an addition of acetic acid anhydride or acetyl chloride to the phosphoric acid anhydride, or by the employment of acetyl phosphoric acid instead of orthophosphoric acid. The process according to the invention may be illustrated by the following examples.

I. 300 kgs. of ricinoleic acid are treated with 150 kgs. of phosphoric acid anhydride, the temperature being controlled as by efficient cooling. The reaction product is washed with water to remove excess anhydride and after settlement of the liquid mass the acid wash water is drawn off. The resulting product, or ester, is neutralized with soda lye to form the sodium salt. This product is very readily soluble in water.

II. 300 kgs. of the product of Example I are dissolved in 700 kgs. of trichlor-ethylene and thus produce 1000 kgs. of an excellent washing agent which can be emulsified readily.

III. 300 kgs. of oleic acid is mixed slowly, and under good cooling, with 300 kgs. of acetyl phosphoric acid. The reaction product is washed with water and the ester product is neutralized and thus converted into the sodium salt. This ester readily dissolves alcohols, hydrocarbons, halogen hydrocarbons and heterocyclic bases.

The term "a fatty substance containing an ester-forming group" hereinafter employed in the claims is used to define fats and oils including the fatty acids derived therefrom of a nature which contain one or more hydroxyl groups or C=C linkages.

I claim:—

1. A process for the production of water-soluble phosphoric esters of oils and fats, comprising the steps of treating a fatty substance containing an ester forming group with not substantially less than 50% by weight of phosphoric acid anhydride and washing the reaction product.

2. A process for the production of water-soluble phosphoric esters of oils and fats, comprising the steps of treating a fatty substance containing an ester forming group with not substantially less than 50% by weight of phosphoric acid anhydride, together with acetic acid anhydride, and washing the reaction product.

3. A process for the production of water-soluble phosphoric esters of oils and fats, comprising the steps of treating a fatty substance containing an ester forming group with acetyl phosphoric acid in such proportions, that the amount of phosphoric acid anhydride available is not substantially less than 50% by weight of the fatty substance.

4. A process for the production of a salt of a water-soluble phosphoric ester of oils and fats, comprising the steps of treating a fatty substance containing an ester forming group with not substantially less than 50% by weight of phosphoric acid anhydride together with acetyl phosphoric acid, washing the reaction product and treating such product with an alkali metal hydroxide to produce an alkali metal salt.

5. A process for the production of a sodium salt of a water-soluble phosphoric ester of oils and fats, comprising the steps of treating a fatty substance containing an ester forming group with not substantially less 50% by weight of phosphoric acid anhydride, washing the reaction product with water, separating the diluted acid washing liquor from the product, and treating said product with sodium hydroxide solution to convert the ester into a sodium salt.

6. A process for the production of a water-soluble phosphoric ester of oils and fats, consisting in mixing a fatty substance containing an ester forming group with not substantially less than 50% by weight of phosphoric acid anhydride maintaining temperature control by cooling during the reaction, washing the reaction product with water, and separating the diluted acid washing liquor from the product substantially as set forth.

7. A process for the production of water-soluble phosphoric esters of oils and fats, comprising the steps of treating a fatty substance containing an ester forming group with 50% by weight of phosphoric acid anhydride and washing the reaction product.

HEINRICH BERTSCH.